United States Patent
Maruyama et al.

(10) Patent No.: US 7,311,633 B2
(45) Date of Patent: Dec. 25, 2007

(54) VEHICULAR FOUR-WHEEL DRIVE UNIT

(75) Inventors: Taiji Maruyama, Saitama (JP); Kanji Kita, Saitama (JP); Mikihiro Takano, Saitama (JP); Kazunori Miyata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 11/311,265

(22) Filed: Dec. 20, 2005

(65) Prior Publication Data

US 2006/0100054 A1   May 11, 2006

(30) Foreign Application Priority Data

Jul. 30, 2004 (JP) ............................. 2004-224539
Dec. 28, 2004 (JP) ............................. 2004-379408

(51) Int. Cl.
*F16H 48/10* (2006.01)
(52) U.S. Cl. ...................................... 475/249; 475/221
(58) Field of Classification Search ..................... None
See application file for complete search history.

(56) References Cited

U.S. PATENT DOCUMENTS 6,726,591 B2 * 4/2004 Maruyama et al. ......... 475/330
7,083,541 B2 * 8/2006 Pecnik et al. ............... 475/221

FOREIGN PATENT DOCUMENTS

JP   2003-48441   2/2003

* cited by examiner

*Primary Examiner*—Ha Ho
*Assistant Examiner*—Derek D. Knight
(74) *Attorney, Agent, or Firm*—Westerman, Hattori, Daniels & Adrian, LLP.

(57) ABSTRACT

A vehicular drive unit comprises a central differential mechanism and a front-wheel side axle differential mechanism. The central differential mechanism comprises a first planetary gear train 10, which includes an output gear body 50, a first carrier 13, which is provided in a one-piece body with this gear body, a first sun gear 11, a first ring gear 14, and a rear-wheel drive gear 15, which is a helical gear formed around this ring gear in a one-piece body. In this drive unit, a differential limiter C is provided between the output gear body 50 (input rotating member) and a drive gear body 55 (output rotating member) to generate a rotational resistance, which acts to reduce the rotational difference between the output gear body 50 and the drive gear body 55.

8 Claims, 16 Drawing Sheets

VEHICULAR FOUR-WHEEL DRIVE UNIT

FIELD OF THE INVENTION

The present invention relates to a vehicular four-wheel drive unit, which transmits the rotational driving force of a drive source (an engine or the like) to the front wheels and to the rear wheels for rotationally driving all the four wheels. The present invention relates particularly to a vehicular four-wheel drive unit, which transmits the rotational driving force of the drive source through a central differential mechanism to the front and rear wheels, the driving force being divided into four components for the four wheels.

BACKGROUND OF THE INVENTION

A four-wheel drive vehicle, which drives the front wheels and the rear wheels together, has been generally known, and a four-wheel drive vehicle that comprises a central differential mechanism has been also known. In the later case, the central differential mechanism is positioned between the front wheels and the rear wheels such that the rotational driving force of the engine is divided by and transmitted through the central differential mechanism to the front wheels and to the rear wheels. In such a four-wheel drive vehicle, axle differential mechanisms are provided, respectively, for the front wheels and for the rear wheels, each axle differential mechanism dealing with the rotational difference occurring between the right wheel and the left wheel. As a result, it is necessary for such a four-wheel drive vehicle to be equipped with a central differential mechanism and front and rear axle differential mechanisms, totaling to three differential mechanisms.

If such three differential mechanisms are provided each separately, then the construction of the power transmission apparatus requires a large number of parts, presenting problems of the transmission apparatus requiring a large size as well as a high manufacturing cost. To solve such problems, there has been a proposal that either one of the front and rear axle-differential mechanisms be constructed together with the central differential mechanism as one integrated unit (refer to, for example, Japanese Laid-Open Patent Publication No. 2003-48441). According to the apparatus that is proposed for constructing the front axle-differential mechanism and the central differential mechanism as an integrated unit, it is expected that the power transmission apparatus be made compact as a whole.

However, in the integrated differential mechanism, which integrates the front axle differential mechanism and the central differential mechanism, each differential mechanism is open type. For example, if one of the four wheels slips and rotates without any load, then most of the rotational driving force is directed to this slipping wheel, so there is a problem that the vehicle as a whole cannot receive sufficient driving force. Furthermore, if the slip of the wheel rotating without any load is controlled by the brake, then it can present another problem that the brake must perform increased work.

SUMMARY OF THE INVENTION

The present invention is to solve such problems, and it is an object of the present invention to provide a vehicular four-wheel drive unit that can transmit, in a case where one wheel is slipping, a driving force to the other wheels, which are not slipping, by limiting the rotational difference of the wheels by a differential mechanism.

The present invention provides a vehicular four-wheel drive unit that comprises a central differential mechanism and an axle-differential mechanism in a housing. In the drive unit, the central differential mechanism divides and transmits the rotational driving force of a drive source (for example, the engine E described in the following embodiment) to the front-wheel side and to the rear-wheel side, and the axle-differential mechanism further divides and transmits the rotational driving force that have been divided by the central differential mechanism to the right wheel and to the left wheel of one of the front-wheel side and the rear-wheel side. The central differential mechanism comprises a single pinion type first planetary gear train that includes an input gear member (for example, the output gear body 50 described in the following embodiment), which receives the rotational driving force of the drive source and is thereby driven rotationally, a first carrier member (for example, the first carrier 13 described in the following embodiment), which is provided in a one-piece body with the input gear member, a first sun gear member (for example, the first sun gear 11 described in the following embodiment), a first ring gear member (for example, the first ring gear 14 described in the following embodiment) and an output gear member (for example, the rear-wheel drive gear 15 described in the following embodiment), which is provided in a one-piece body with and around the first ring gear member and which transmits the rotational driving force to the other of the front-wheel side and the rear-wheel side. The axle-differential mechanism comprises a double pinion type second planetary gear train that includes a second ring gear member (for example, the second ring gear 24 described in the following embodiment), which is provided in a one-piece body with the first sun gear member, a second sun gear member (for example, the second sun gear 21 described in the following embodiment), which is connected to one of the right and left wheels, and a second carrier member (for example, the second carrier 23 described in the following embodiment), which is connected to the other of the right and left wheels. Furthermore, a cylindrical retaining member (for example, the second retaining member 52 described in the following embodiment) is fitted to the first carrier member, which is provided in a one-piece body with the input gear member, so that they together constitute an input rotating member, in which the second planetary gear train is disposed. In addition, the first ring gear member and the output gear member constitute a cylindrical output rotating member (for example, the drive gear body 55 described in the following embodiment) in a one-piece body, which is disposed radially surrounding the retaining member. Furthermore, a differential limiter is provided between the inner circumferential surface of the input gear member and the outer circumferential surface of the output rotating member, so that the differential limiter generates a rotational resistance, which acts to reduce the rotational difference between the input rotating member and the output rotating member.

In the vehicular four-wheel drive unit according to the present invention, it is preferable that the differential limiter comprise an input-side friction member (for example, the clutch plates 70 described in the following embodiment), which is disposed on the inner circumferential surface of the input gear member, and an output-side friction member (for example, the clutch discs 80 described in the following embodiment), which is disposed on the outer circumferential surface of the output rotating member, the friction members being disposed also one after the other in the direction of rotational axis between the input rotating member and the output rotating member. In this case, the output rotating member is slidable with respect to the retaining member in the direction of rotational axis, and the output gear member comprises a helical gear. With this arrangement, while the rotational driving force is being transmitted through the output gear member, a thrust being generated in the direction of rotational axis acts to squeeze the input-side friction member and the output-side friction member between the input rotating member and the output rotating member such that a friction being generated between the input-side friction member and the output-side friction member will act as the rotational resistance, which reduces the rotational difference between the input rotating member and the output rotating member.

For this arrangement, it is also preferable that the vehicular four-wheel drive unit be constructed such that the input-side friction member and the output-side friction member are squeezed between the input rotating member and the output rotating member by the thrust being generated while the rotational driving force is being transmitted for acceleration through the output gear member and also by the thrust being generated while the rotational driving force is being transmitted for deceleration.

It is also preferable that the vehicular four-wheel drive unit further comprise a first clutch (for example, the deceleration-side clutch C3 described in the following embodiment), which is provided between the input gear member and the output rotating member on one side along the rotational axis, and a second clutch (for example, the acceleration-side clutch C2 described in the following embodiment), which is provided between the retaining member and the output rotating member on the other side along the rotational axis. In this case, the first clutch is brought into engagement by the slide of the output rotating member to the one side, the engagement of the first clutch making the input rotating member and the output rotating member rotate together as a one-piece body. The second clutch is brought into engagement by the slide of the output rotating member to the other side, the engagement of the second clutch making the input rotating member and the output rotating member rotate together as a one-piece body.

For this arrangement, it is preferable that the first clutch comprise a friction material with a high friction coefficient, which material is provided between the input gear member and the output rotating member on one side along the rotational axis. It is also preferable that the second clutch comprise a friction material with a high friction coefficient, which material is provided between the retaining member and the output rotating member on the other side along the rotational axis. Alternatively, the first clutch may comprise a locking mechanism, which is provided between the input gear member and the output rotating member on one side along the rotational axis; and the second clutch may also comprise a locking mechanism, which is provided between the retaining member and the output rotating member on the other side along the rotational axis.

In the vehicular four-wheel drive unit according to the present invention, it is preferable that the differential limiter comprise an input-side plate (for example, the outer plates 91 described in the following embodiment), which is disposed on the inner circumferential surface of the input gear member, an output-side plate (for example, the inner plates 92 described in the following embodiment), which is disposed on the outer circumferential surface of the output rotating member, and a power-transmission chamber, which accommodates the input-side plate and the output-side plate and which is filled with a viscous fluid (for example, silicon oil). In this case, a viscous resistance being generated by the viscous fluid against the input-side plate and the output-side plate being rotated acts as the rotational resistance, which reduces the rotational difference between the input rotating member and the output rotating member.

While the front wheels or the rear wheels of the vehicle are slipping, there is a tendency that the rotational driving force act mainly on the slipping wheels. However, with the vehicular four-wheel drive unit according to the present invention, which is constructed as described above, the differential limiter enables the other wheels, which are not slipping, to receive the driving force of the drive source without concentration of the driving force on the slipping wheels. This differential limiter is disposed radially inside the input gear member, so the provision of the differential limiter will not contribute to enlargement of the vehicular four-wheel drive unit.

In the case where a gear reaction acting on the output gear member is utilized to slide the output rotating member with respect to the retaining member for bringing the input-side friction member and the output-side friction member into contact with each other generating a friction as a rotational resistance for reducing the rotational difference, the differential limiter requires no special parts for the actuation. Therefore, the construction of the drive unit is relatively simple, so the unit can be manufactured cost-effectively without weight increase. Furthermore, if the gear reaction becomes large enough in the actuation, then the first or second clutch interlocks the input gear member and the output rotating member and makes them rotate together as a one-piece body. This feature is advantageous in escaping from bad road condition.

In the case where the differential limiter comprises a viscous coupling with a viscous fluid, there is no delay in the response of the differential limiter when a rotational difference occurs between the input rotating member and the output rotating member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
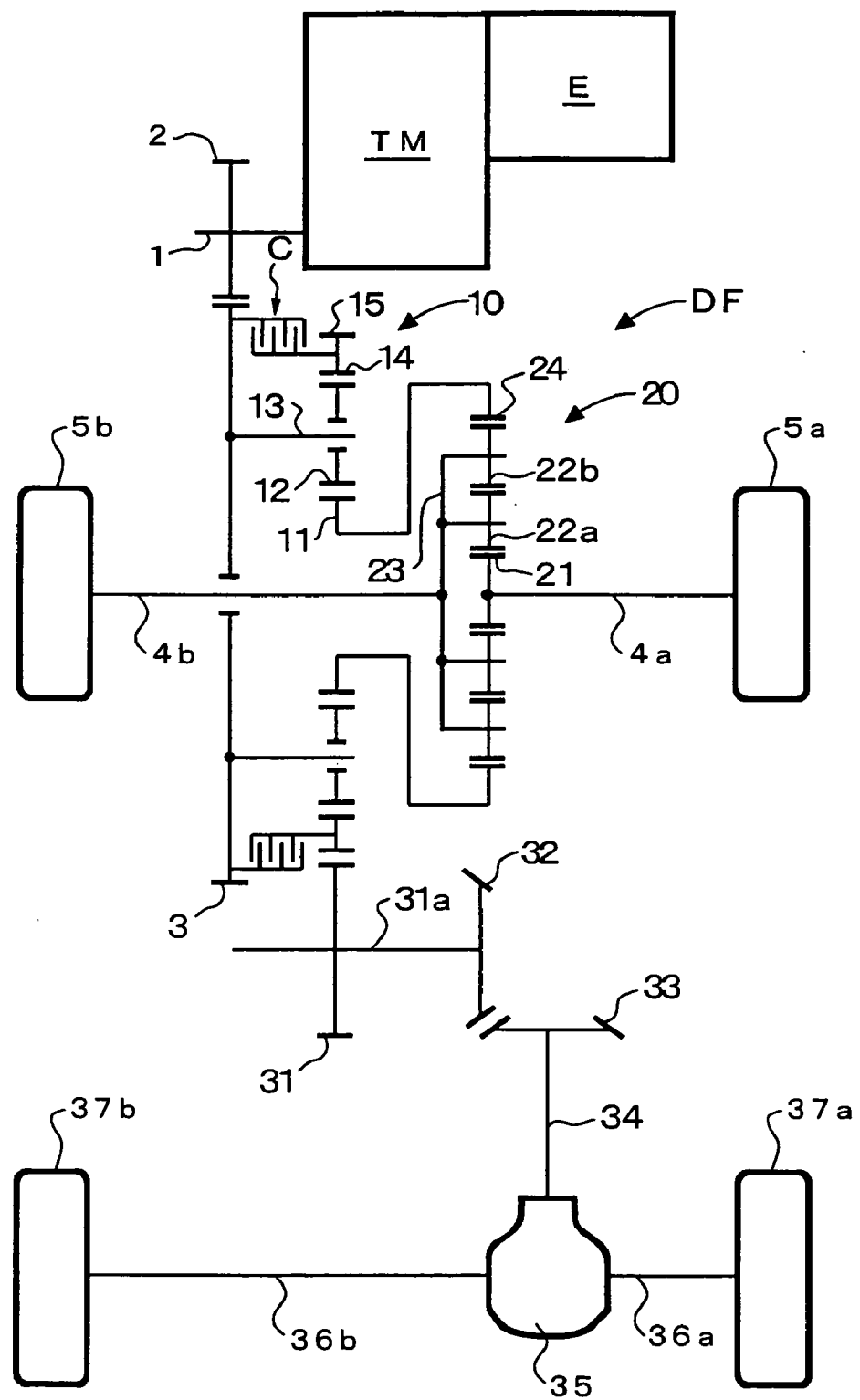
FIG. 1 is a schematic diagram showing the construction of a power transmission system, which comprises a vehicular four-wheel drive unit according to the present invention.

Now, preferred embodiments according to the present invention are described in reference to the drawings. FIG. 1 shows a power transmission system, which comprises a vehicular four-wheel drive unit as a preferred embodiment. At first, an explanation is given of this power transmission system. This power transmission system distributes and transmits the rotational driving force of an engine E to the right and left front wheels 5a and 5b as well as to the right and left rear wheels 37a and 37b. The rotational power generated by the engine E is transmitted to a ratio-change mechanism TM, which comprises a torque converter and gear trains, etc. and which effects a change in rotational speed. After a rotational speed change, the rational power is transmitted from an output drive gear 2, which is fixed on the output shaft 1 of the transmission, to a power divider DF, which as a preferred embodiment has a design of four-wheel drive unit according to the present invention. The power divider DF comprises an output driven gear 3, which meshes with the output drive gear 2, a first planetary gear train 10 and a second planetary gear train 20, which are provided coaxially with the output driven gear 3.

The first planetary gear train 10 comprises a first sun gear 11, which is provided coaxially with the output driven gear 3, a first carrier 13, which is provided coaxially to the first sun gear 11 and fixed on the output driven gear 3, a plurality of first pinion gears 12, which are retained individually rotatable by the first carrier 13 and mesh with and revolve around the first sun gear 11, and a first ring gear 14, which has internal teeth to mesh with the first pinion gears 12 and rotates coaxially with the first sun gear 11, enclosing the first pinion gears 12. It is understood from this description that the first planetary gear train 10 is a single-pinion type planetary gear train. Moreover, the first sun gear 11 is formed with the second ring gear 24 of the second planetary gear train 20 in a one-piece body. Furthermore, a rear-wheel drive gear 15 is provided on the outer periphery of the first ring gear 14 in a one-piece body, which drive gear is used for transmitting the driving force to the rear-wheel side.

The second planetary gear train 20 comprises a second sun gear 21, which is disposed coaxially with the output driven gear 3 and the first sun gear 11, a second carrier 23, which is disposed coaxially to the second sun gear 21, a plurality of inner pinion gears 22a, a plurality of outer pinion gears 22b, and a second ring gear 24. The inner pinion gears 22a are retained individually rotatable by the second carrier 23 and meshes with and revolve around the second sun gear 21, and the outer pinion gears 22b are also retained individually rotatable by the second carrier 23 and meshes with corresponding inner pinion gears 22a, respectively, the inner pinion gears 22a and the outer pinion gears 22b together revolving around the second sun gear 21. The second ring gear 24 has internal teeth by which the second ring gear 24 meshes with and encloses the outer pinion gears 22b, and the second ring gear 24 rotates coaxially with the second sun gear 21. It is understood from this description that the second planetary gear train 20 is a double-pinion type planetary gear train. As mentioned above, the second ring gear 24 is combined with the first sun gear 11 in a one-piece body. Furthermore, the second sun gear 21 is connected through a right axle shaft 4a to the right front wheel 5a, and the second carrier 23 is connected through a left axle shaft 4b to the left front wheel 5b.

On the other hand, the rear-wheel drive gear 15, which is provided in a one-piece body with the first ring gear 14 on the periphery thereof, meshes with a rear-wheel driven gear 31, which is provided on a rear-wheel drive shaft 31a with a first bevel gear 32. This bevel gear meshes with a second bevel gear 33, which is connected to a propeller shaft 34, and the propeller shaft 34 is connected to a rear-wheel side axle differential mechanism 35. The rear-wheel side axle differential mechanism 35 is connected through right and left axle shafts 36a and 36b, respectively, to the right and left rear wheels 37a and 37b.

In the power transmission system, which is constructed as described above, the rotational power by the engine E is modified in rotational speed by the ratio-change mechanism TM, and this rotation is transmitted from the output drive gear 2, which is fixed on the output shaft 1 of the transmission, to the output driven gear 3, which is fixed to the first carrier 13 of the first planetary gear train 10. The rotational driving force of the output driven gear 3 is transmitted as is to the first carrier 13, and it is then distributed to the first sun gear 11 and to the first ring gear 14, which mesh with the first pinion gears 12 retained rotatable by the first carrier 13. It is clear from the above description that the first sun gear 11 is connected to the front-wheel side while the first ring gear 14 is connected to the rear-wheel side and that the first planetary gear train 10 functions as central differential mechanism.

The rotational driving force transmitted to the first sun gear 11 is then transmitted as is to the second ring gear 24, which is provided in a one-piece body with first sun gear 11. From there, it is divided to the second carrier 23, which retains rotatably the outer pinion gears 22b and the inner pinion gears 22a being meshed with the second ring gear 24, and to the second sun gear 21, which meshes with the inner pinion gears 22a. The rotational driving force transmitted to the second carrier 23 is then transmitted through the left axle shaft 4b to the left front wheel 5b while the rotational driving force transmitted to the second sun gear 21 is then transmitted through the right axle shaft 4a to the right front wheel 5a, rotating the right and left front wheels 5a and 5b, respectively. It is clear from this that the second planetary gear train 20 functions as front-wheel side axle differential mechanism.

On the other hand, the rotational driving force transmitted to the first ring gear 14 is then transmitted from the rear-wheel drive gear 15, which is provided on the outer periphery of the first ring gear 14 in a one-piece body, to the rear-wheel driven gear 31, which meshes with the rear-wheel drive gear 15. From there, the rotational driving force is transmitted from the first bevel gear 32, which is provided on the rear-wheel drive shaft 31a, to the second bevel gear 33, which is provided on the propeller shaft 34, and then to the rear-wheel side axle differential mechanism 35. The rotational driving force is divided there and distributed to the right and left axle shafts 36a and 36b, driving and rotating the right and left rear wheels 37a and 37b, respectively.

Figure 2:
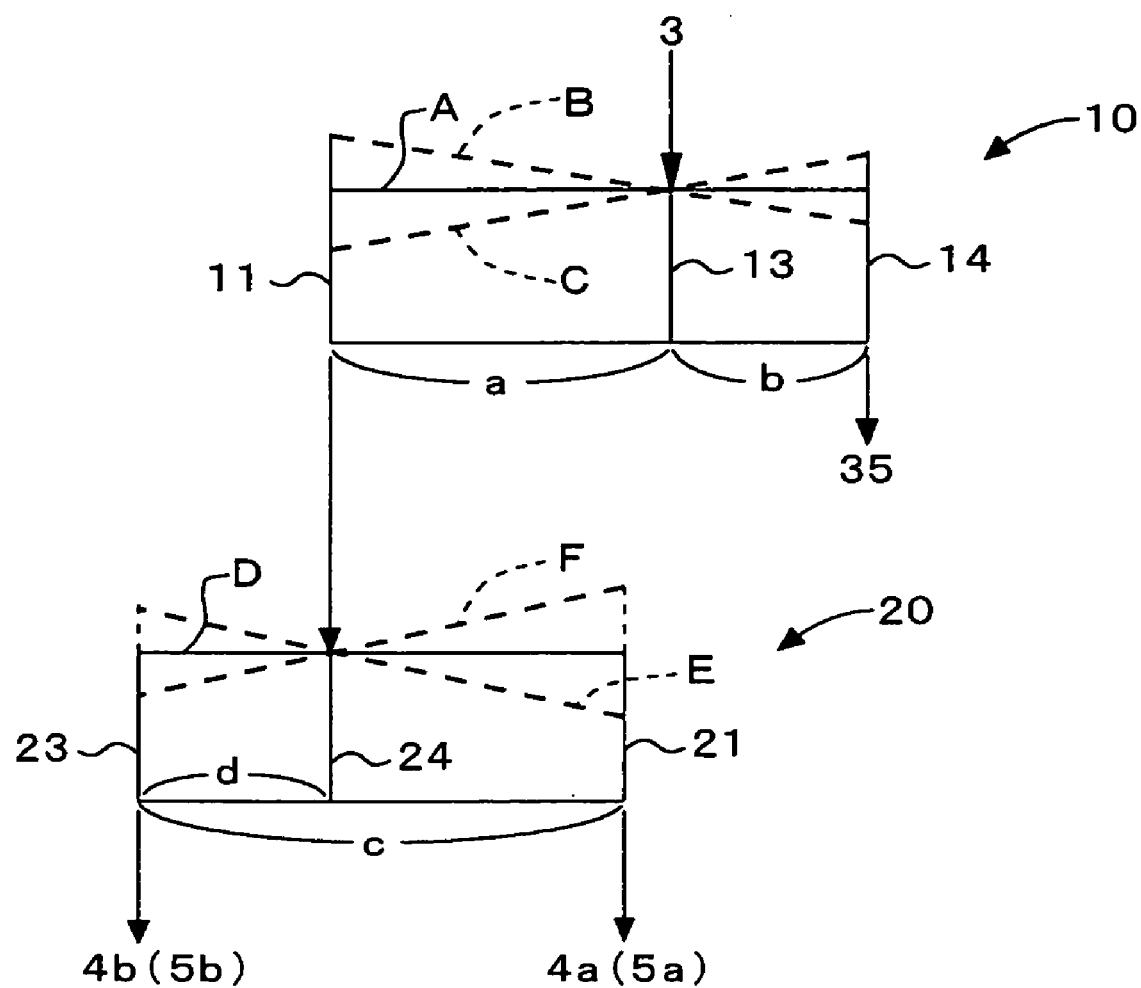
FIG. 2 is a velocity line diagram describing relations in rotational speed among the rotating elements that constitute first and second planetary gear trains, which constitute the four-wheel drive unit.

Now, the operation of the first planetary gear train 10 as central differential mechanism and that of the second planetary gear train 20 as front-wheel side axle differential mechanism are explained in reference to the velocity line diagram of FIG. 2, which shows relations in rotational speed among the first sun gear 11, the first carrier 13 and the first ring gear 14 of the first planetary gear train 10, and among the second sun gear 21, the second carrier 23 and the second ring gear 24 of the second planetary gear train 20.

In the velocity line diagram, the rotational speed of each rotating element is represented by the distance in vertical direction away from the horizontal base line, and horizontal distances a, b, c and d, between the respective elements correspond to the reciprocals of the numbers of teeth of the sun gear and the ring gear, respectively. For the first planetary gear train 10, because it is of a single pinion type, the positional order of the rotating elements from the left side in the drawing is as follows: the first sun gear 11, the first carrier 13 and the first ring gear 14. Here, the horizontal distance between the vertical line indicating the first sun gear 11 and that indicating the first carrier 13 is $a=1/Ns1$ while the horizontal distance between the vertical line indicating the first carrier 13 and that indicating the first ring gear 14 is $b=1/Nr1$. On the other hand, for the second planetary gear train 20, because it is of a double pinion type, the positional order of the rotating elements are different from that for the first planetary gear train 10, and the order from the left side is the second carrier 23, the second ring gear 24 and the second sun gear 21. In this case, the horizontal distance between the vertical line indicating the second sun gear 21 and that indicating the second carrier 23 is $c=1/Ns2$ while the horizontal distance between the vertical line indicating the second carrier 23 and that indicating the second ring gear 24 is $d=1/Nr2$. In the above equations, $Ns1$, $Nr1$, $Ns2$ and $Nr2$ represent the numbers of teeth of the first sun gear 11, the first ring gear 14, the second sun gear 21 and the second ring gear 24, respectively.

As understood from this velocity line diagram, as the rotational driving force of the engine E is transmitted from the output driven gear 3 to the first carrier 13, it is divided and distributed to the first sun gear 11 and to the first ring gear 14, so that it is transmitted to the front-wheel side and to the rear-wheel side. In this arrangement, the whole of the first planetary gear train 10 rotates together as one body for driving and rotating all the front and rear wheels at a same rotational speed as indicated by real line A in the velocity line diagram. From this condition, if, for example, the front wheels experience slips and thereby a reduced load that is smaller than the load of the rear wheels, then there is an increase in the rotational speed of the first sun gear 11, which is connected to the front-wheel side, while there is a decrease in the rotational speed of the first ring gear 14, which is connected to the rear-wheel side, as indicated by broken line B. On the other hand, if the rear wheels experience slips and thereby a reduced load that is smaller than the load of the front wheels, then there is an increase in the rotational speed of the first ring gear 14, which is connected to the rear-wheel side, while there is a decrease in the rotational speed of the first sun gear 11, which is connected to the front-wheel side, as indicated by broken line C. In this way, the first planetary gear train 10, while accommodating the rotational speed difference between the front wheels and the rear wheels, divides and transmits the rotational driving force to all the wheels, thus functioning as central differential mechanism.

The rotational driving force that is divided and transmitted to the first sun gear 11 in the first planetary gear train 10 is transmitted to the second ring gear 24, which is formed in a one-piece body with the first sun gear 11. The rotational driving force of the second ring gear 24 is distributed to the second sun gear 21 and to the second carrier 23 in the planetary gear train 20 and transmitted to the right and left front wheels. In this arrangement, the whole of the second planetary gear train 20 rotates together as one body for driving and rotating the right and left front wheels at a same rotational speed without any slip as indicated by real line D in the velocity line diagram. On the other hand, if, for example, the left front wheel 5b experiences slips and thereby a reduced load that is smaller than the load of the right front wheel 5a, then there is an increase in the rotational speed of the second carrier 23, which is connected to the left front wheel 5b, while there is a decrease in the rotational speed of the second sun gear 21, which is connected to the right front wheel 5a, as indicated by broken line E. On the other hand, if the right front wheel 5a experiences a reduced load, then there is an increase in the rotational speed of the second sun gear 21, which is connected to the right front wheel 5a, while there is a decreases in the rotational speed of the second carrier 23, which is connected to the left front wheel 5b, as indicated by broken line F. In this way, the second planetary gear train 20, while accommodating the rotational speed difference between the right front wheel 5a and the left front wheel 5b, divides and transmits the rotational driving force to the right and left front wheels, thus functioning as front-wheel side axle differential mechanism.

As it is expected from the above description, if any one of the front and rear wheels 5a, 5b, 37a and 37b slips, then that specific wheel experiences a rise in its rotational speed. In this instance, the other wheels, which do not slip, i.e., the wheels that make the rotational driving force of the engine E act on the road for driving the vehicle, are not likely to receive the rotational driving force of the engine E in sufficient amount. To solve this problem, the power divider DF as a preferred embodiment according to the present invention comprises a differential limiter C positioned between the output driven gear 3 (or the first carrier 13) and the first ring gear 14 as shown in FIG. 1, for reducing the rotational difference between the first carrier 13 and the first ring gear 14 by the actuation of the differential limiter C.

EXAMPLE 1

Figure 3:
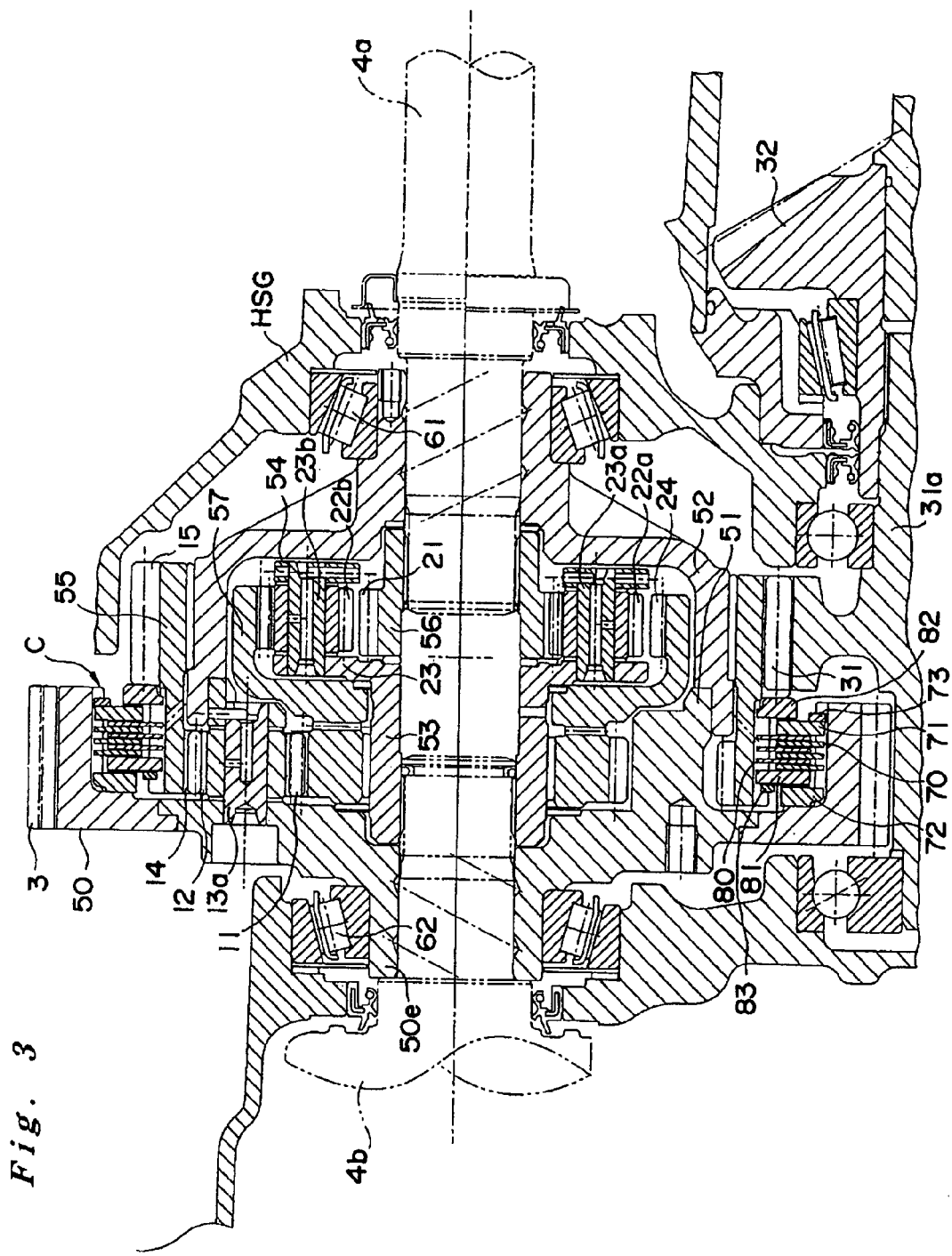
FIG. 3 is a sectional view of a four-wheel drive unit as a first preferred embodiment according to the present invention.
Figure 4:
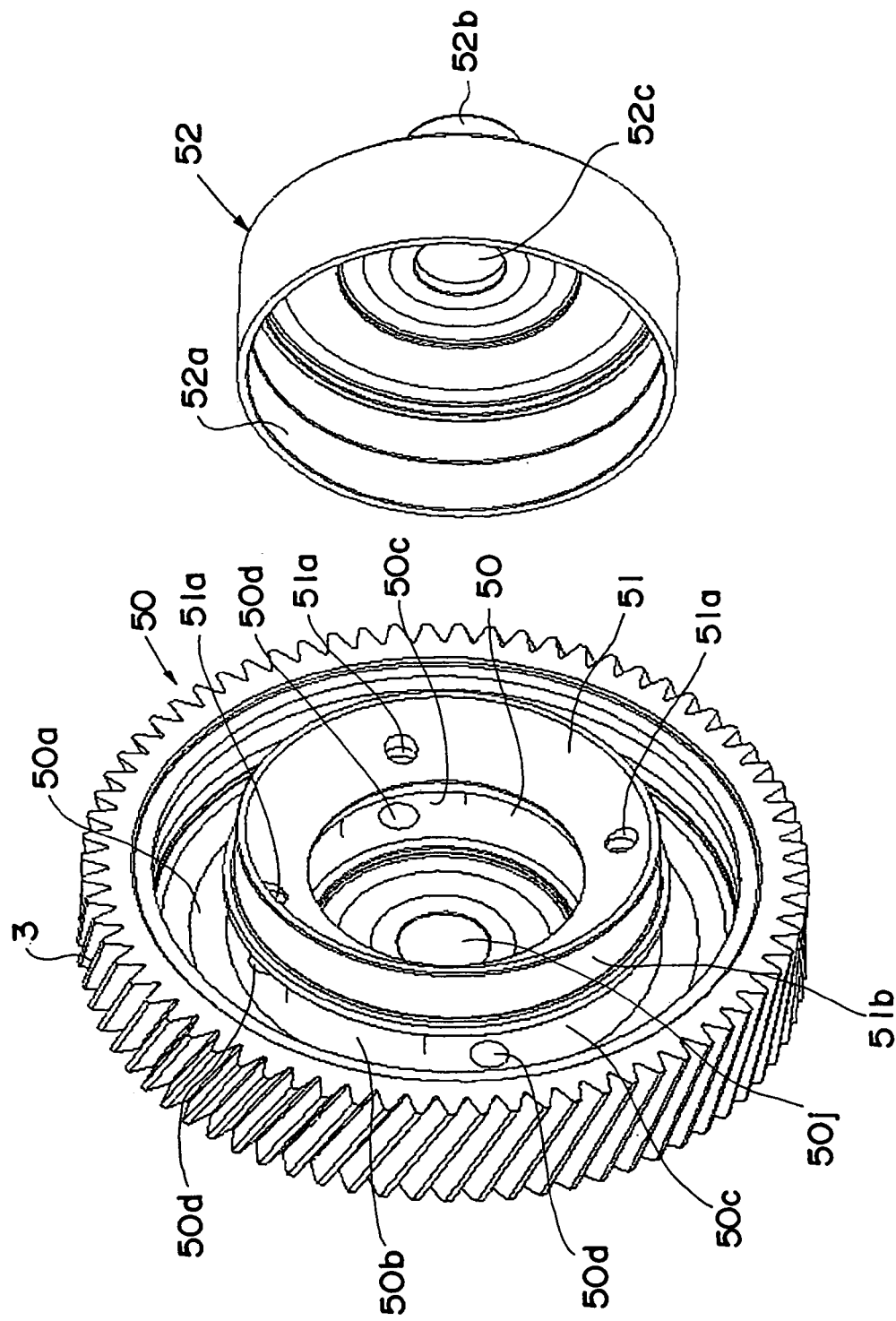
FIG. 4 is a perspective view of an output gear body and a second retaining member, which constitute the four-wheel drive unit, the gear body and the retaining member fitting with each other.

Now, a specific construction of power divider DF as a first embodiment is described in reference to FIG. 3. The power divider DF holds rotatably the output driven gear 3 and the first and second planetary gear trains 10 and 20 by a pair of right and left taper roller bearings 61 and 62 in a housing HSG. The left side boss portion 50e of the output gear body 50, which includes the output driven gear 3 at its outer periphery, is supported rotatably by the left taper roller bearing 62 in the housing HSG. The output gear body 50, which is shown in FIG. 4, comprises a wall surface 50a, which is positioned radially inward from the output driven gear 3 and has a concave portion opening rightward. From the wall surface 50a, a plurality of connection arms 50b protrude rightward, and at the tips of the connection arms 50b, a ring-like first retaining portion 51 is formed in a one-piece body with the connection arms. As a result, among the connection arms 50b, provided are pinion-disposing rooms 50c, where the first pinion gears 12 are disposed, respectively. By the way, the output gear body 50 as a whole is formed by lost-wax process.

Through the wall surface 50a and the first retaining portion 51 in the axial direction of the power divider, a plurality of pin-press-fitting holes 50d and 51a are provided passing coaxially through the pinion-disposing rooms 50c, respectively, and a first carrier pin 13a is press-fitted in each pair of the pin-press-fitting holes 50d and 51a with the first pinion gears 12 disposed in the pinion-disposing rooms 50c, respectively. As a result, each first pinion gear 12 is supported rotatably on a corresponding first carrier pin 13a as shown in FIG. 3. It is understood from this construction that the first carrier 13 comprises the output gear body 50, the first carrier pins 13a and the first retaining portion 51.

Figure 5:
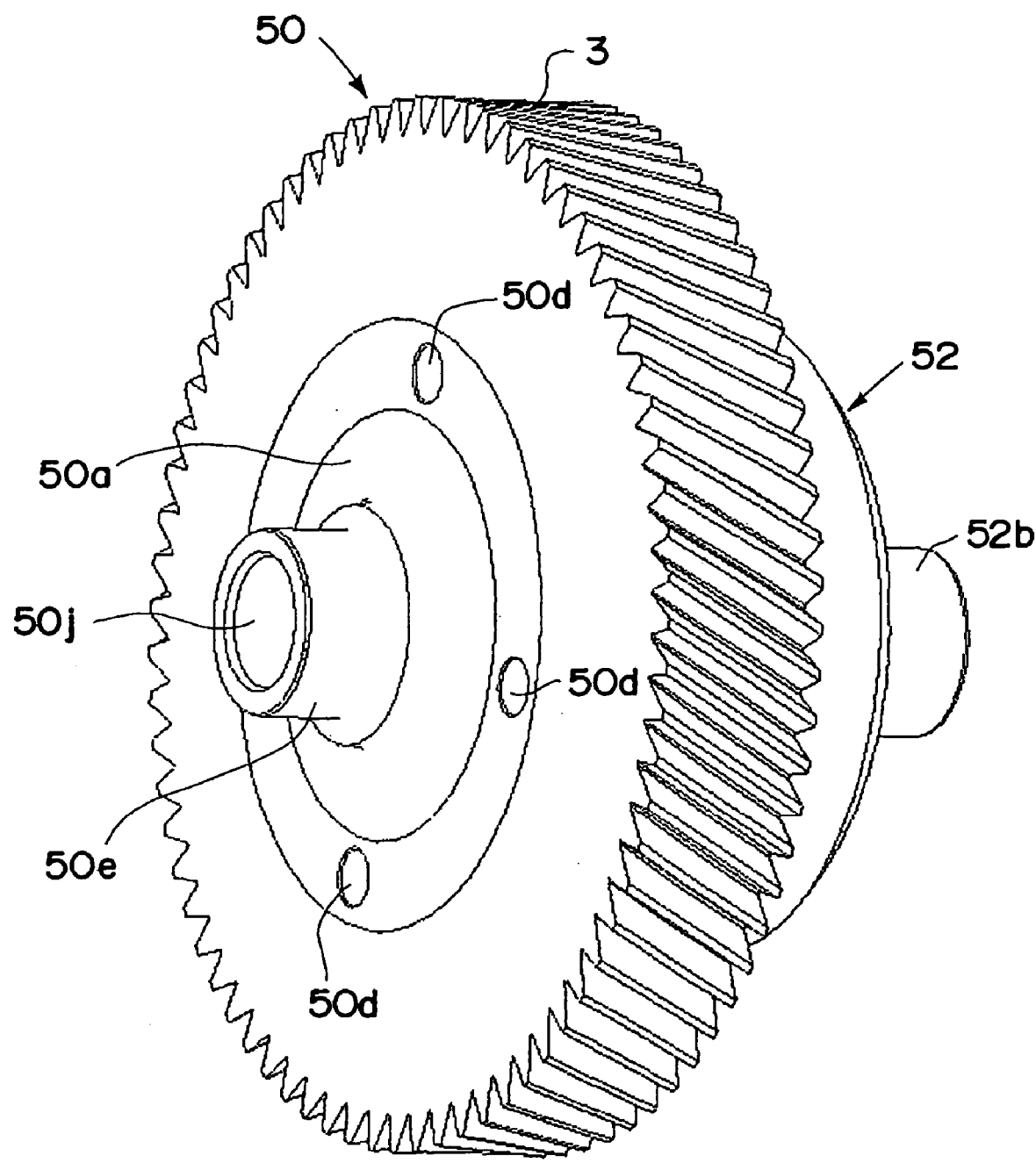
FIG. 5 is a perspective view showing the condition where the output gear body and the second retaining member are fitted with each other.

On the cylindrical peripheral surface 51b of the first retaining portion 51, mounted is a cylindrical second retaining member 52, which has a cylindrical opening leftward as shown in FIG. 4. The internal circumferential surface 52a of the second retaining member 52 is press-fitted with the cylindrical peripheral surface 51b of the first retaining portion 51, so that the input rotating member is assembled as a one-piece body as shown in FIG. 5. The input rotating member, which is assembled as a one-piece body as described above, is then placed in the housing HSG with the right end portion of the input rotating member, i.e., the right side boss portion 52b of the second retaining member 52, being supported rotatably by the right taper roller bearing 61 in the housing HSG. In this way, the input rotating member, which is assembled as a one-piece body from the output gear body 50, the first carrier pins 13a, the first retaining portion 51 and the second retaining member 52, is supported rotatably by the right and left taper roller bearings 61 and 62 in the housing HSG.

Figure 6:
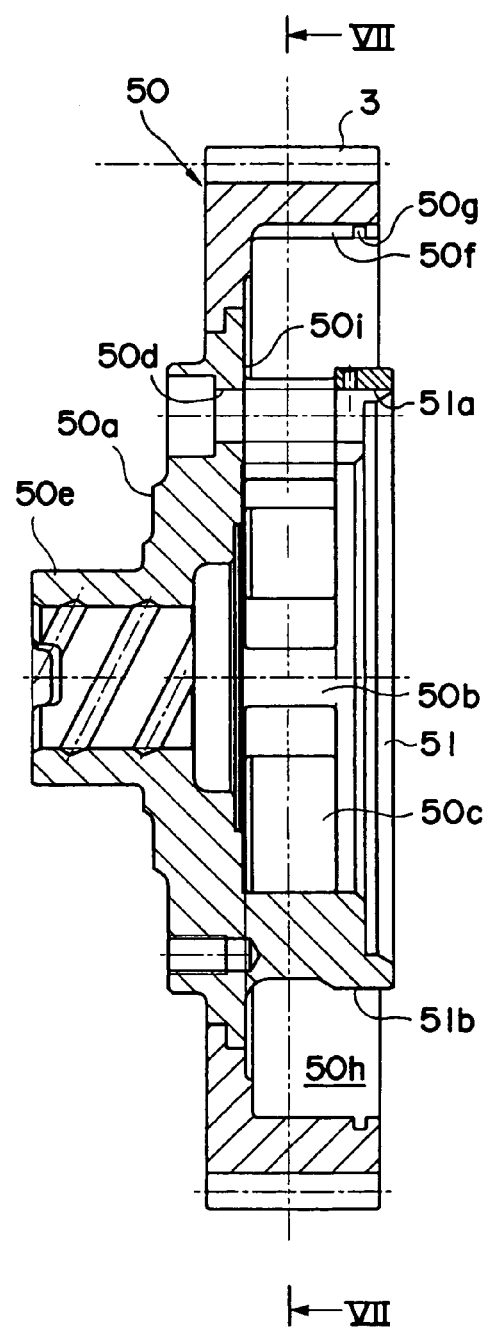
FIG. 6 is a sectional view of the output gear body, which is sectioned in its axial direction.
Figure 7:
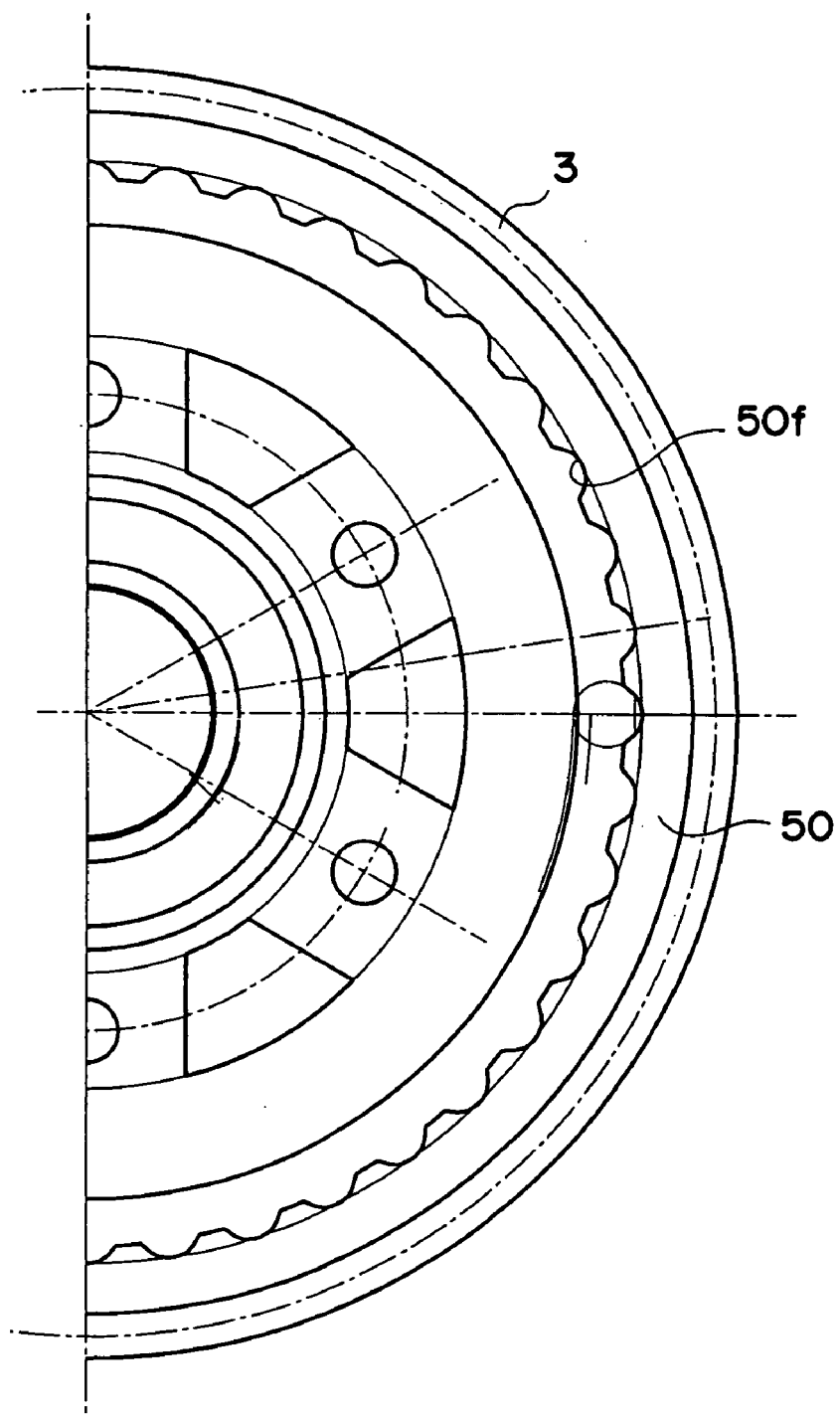
FIG. 7 is a sectional view taken along line VII-VII in FIG. 6.
Figure 8:
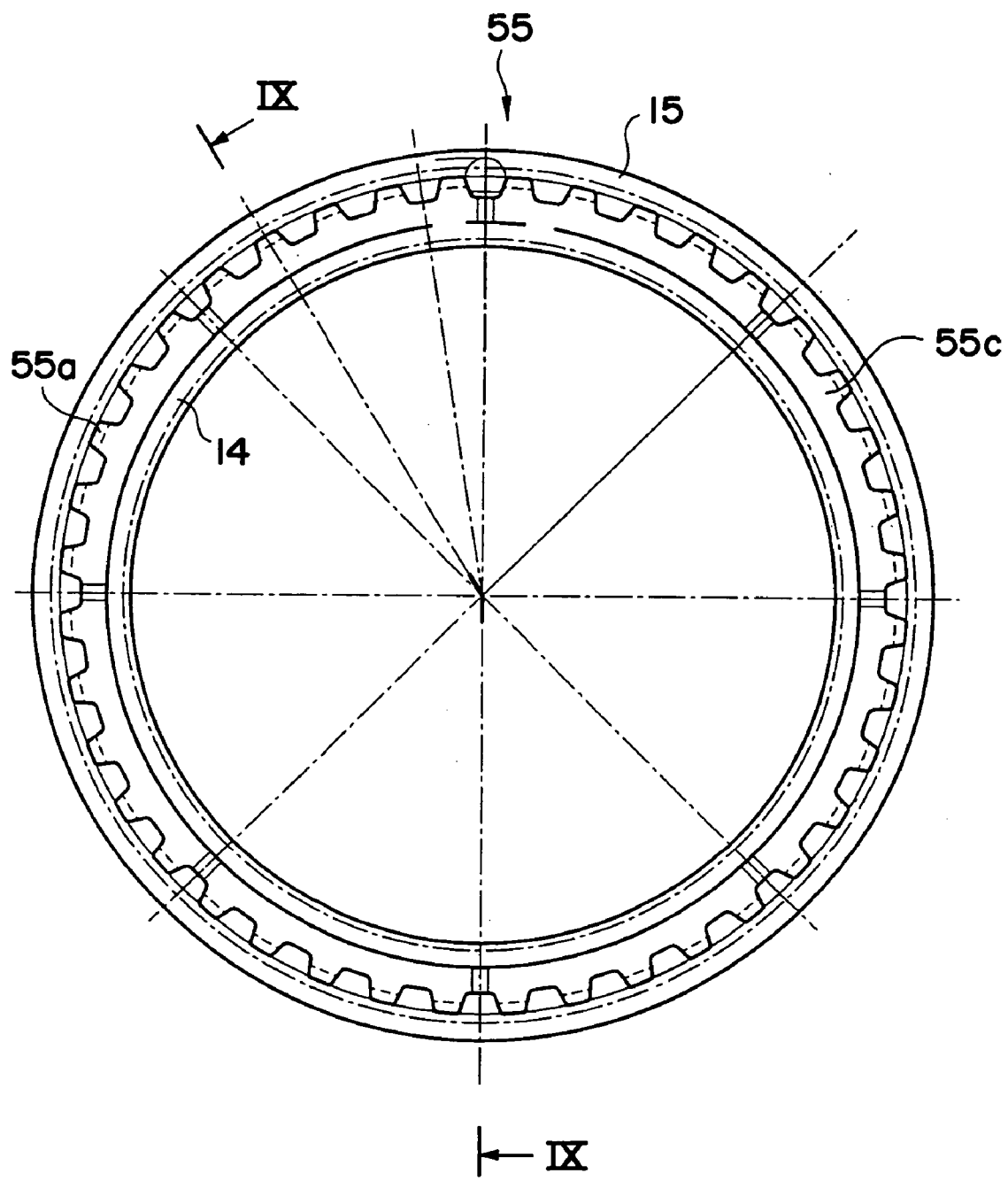
FIG. 8 is a front view of a drive gear body, which constitutes the four-wheel drive unit.
Figure 9:
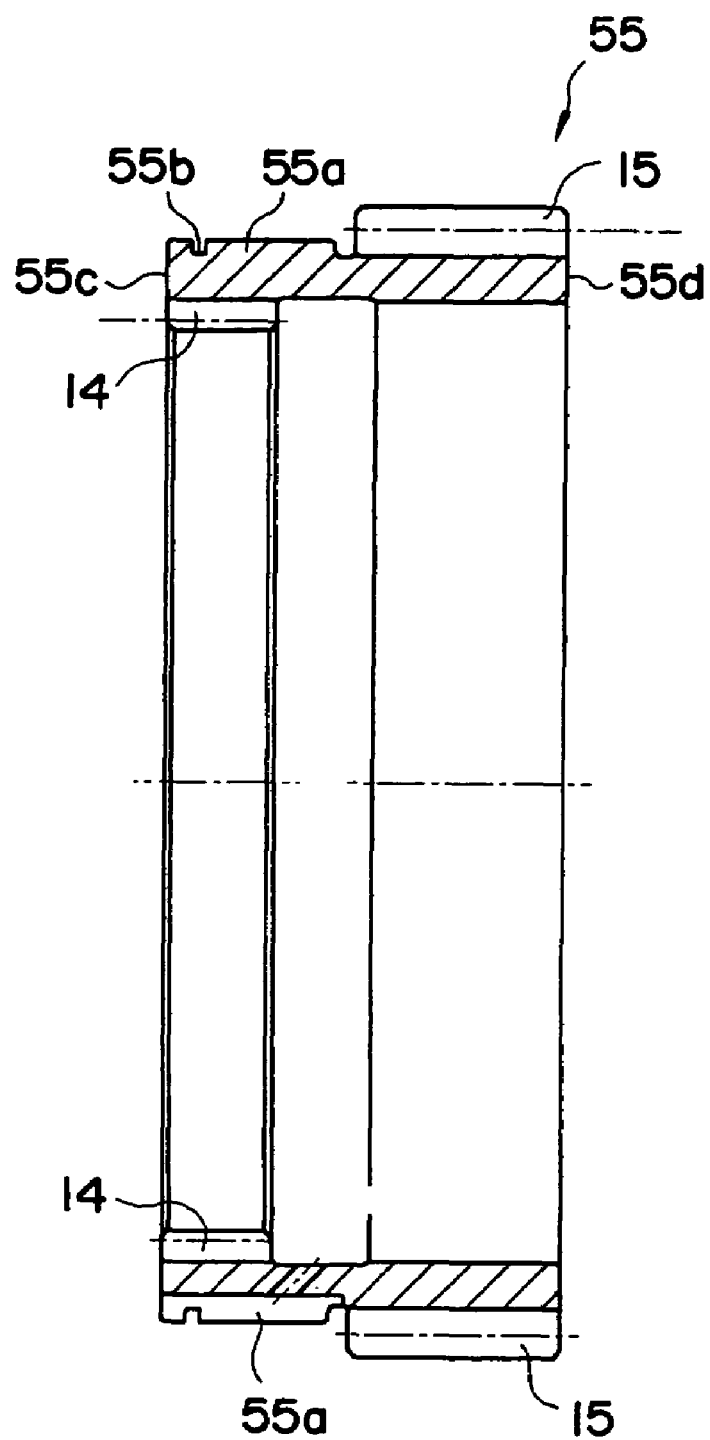
FIG. 9 is a sectional view taken along line IX-IX in FIG. 8.

On the other hand, as shown in FIGS. 6 and 7, a drive gear body 55 (referred to also as "output rotating member"), which includes the first ring gear 14 on its inner circumferential surface and the rear-wheel drive gear 15 on its outer circumferential surface, is disposed in the output rotating member retaining space 50h of the input rotating member, which is located radially outward of the first retaining portion 51. The drive gear body 55 has a differential limiter C, which is disposed on the left outer circumferential portion of the drive gear body 55 and in the output gear body 50. Moreover, the drive gear body 55 is freely rotatable and sidable around and along the rotational axis (in the right and left direction) with respect to the input rotating member, which comprises the first retaining portion 51, etc.

Now, the differential limiter C is explained in reference to FIG. 6 through FIG. 11. The differential limiter C is a wet-type multiple disc clutch (frictionally engaging device), which comprises a plurality of clutch plates 70 disposed in the output gear body 50, an input-side piston plate 71, an input-side contacting member 72, an input-side cir. clip 73, a plurality of clutch discs 80 disposed in the drive gear body 55, an output-side piston disc 81, an output-side contacting member 82 and an output-side cir. clip 83. On the surfaces of the clutch plates 70 and the clutch discs 80, friction materials 70b and 80b are attached concentrically.

Figure 10:
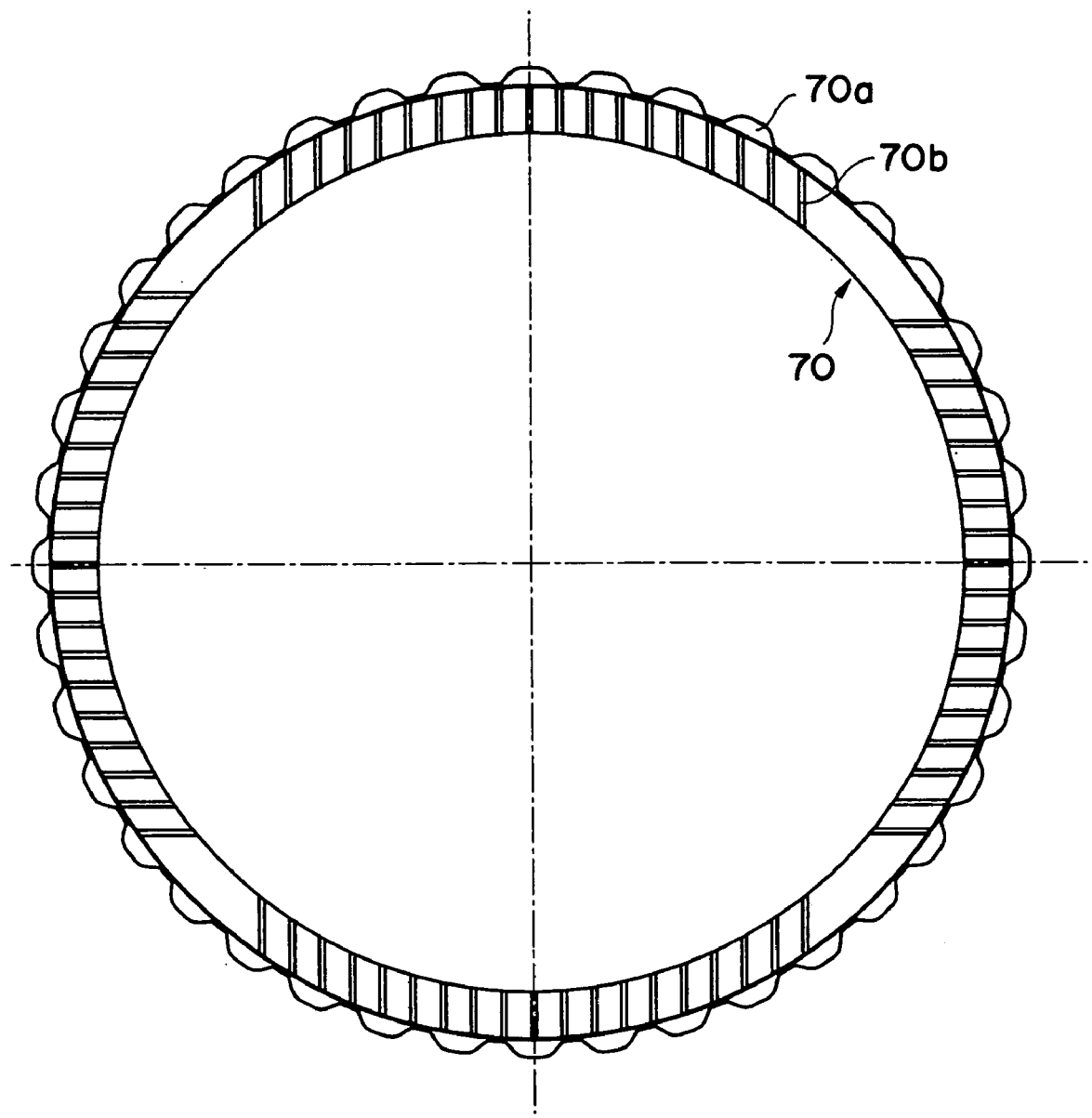
FIG. 10 is a front view of a clutch plate, which constitutes a differential limiter used in the four-wheel drive unit.

On the radially inward side (inner circumferential surface) of the output driven gear 3 of the output gear body 50, a plurality of input-side spline-grooves 50f are provided extending in the right and left direction. The input-side spline-grooves 50f are used for spline-fitting the clutch plates 70 and the input-side piston plate 71, which are formed in doughnut-like discs and are equipped with a plurality of plate-side linking elements 70a projecting radially outward (FIG. 10 shows only the clutch plate 70, but the input-side piston plate 71 has a similar configuration). In the spline-fitting, the plate-side linking elements 70a fit in the input-side spline-grooves 50f, so the clutch plates 70 and the input-side piston plate 71 are retained sidable in the right and left direction with respect to the output gear body 50. However, the rightward movement of the clutch plates 70 and the input-side piston plate 71 is limited by the input-side cir. clip 73, which is placed in an anchoring groove 50g provided at the right end of the input-side spline-grooves 50f.

Figure 11:
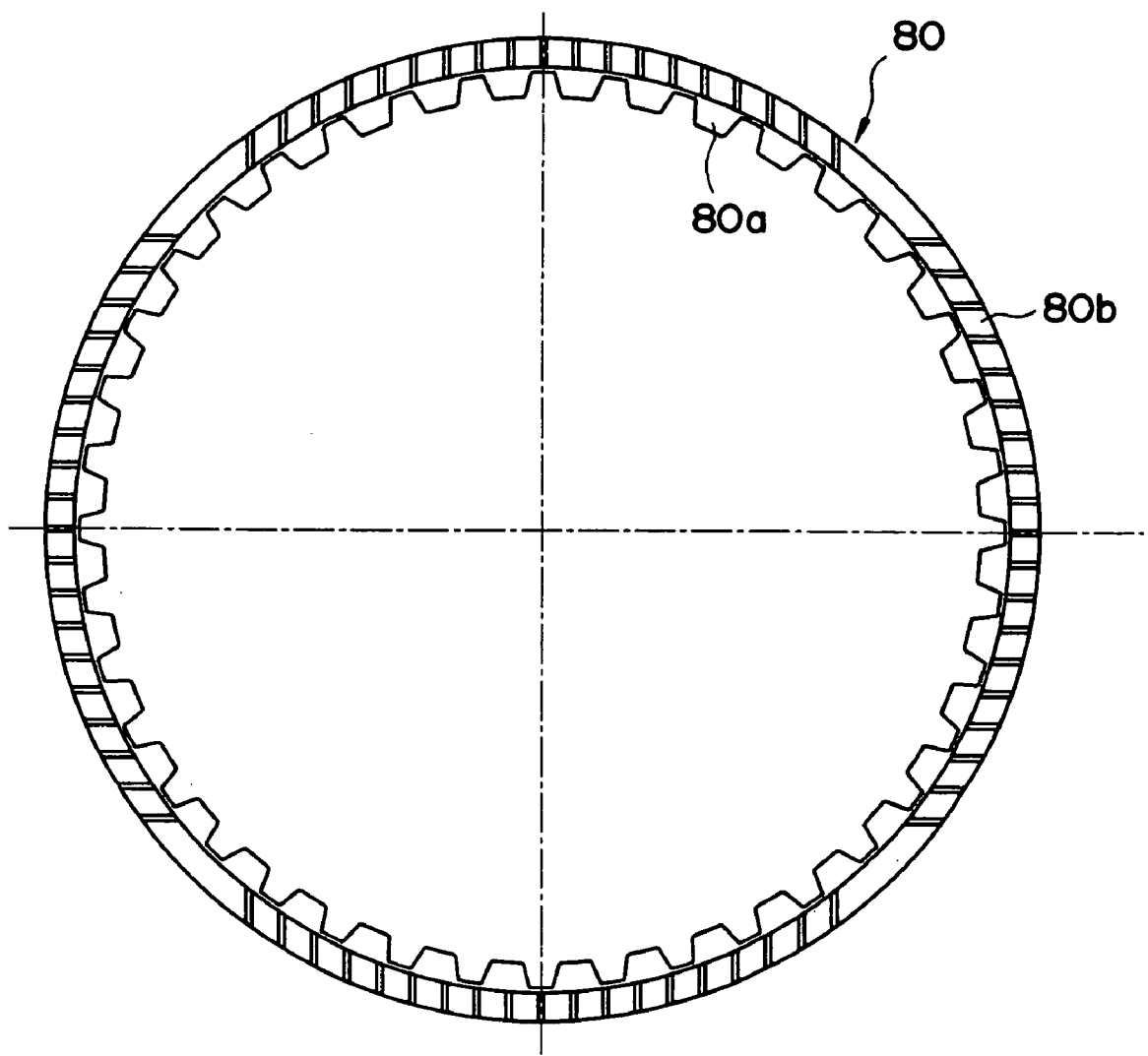
FIG. 11 is a front view of a clutch disc, which constitutes the differential limiter.

On the other hand, on the left radially outward side (outer circumferential surface) of the drive gear body 55, a plurality of output-side spline-grooves 55a are provided extending in the right and left direction. The output-side spline-grooves 55a are used for spline-fitting the clutch discs 80 and the output-side piston disc 81, which are formed in doughnut-like discs and are equipped with a plurality of disc-side linking elements 80a projecting radially inward (FIG. 11 shows only the clutch disc 80, but the output-side piston disc 81 has a similar configuration). In the spline-fitting, the disc-side linking elements 80a fit in the output-side spline-grooves 55a, so the clutch discs 80 and the output-side piston disc 81 are retained slidable in the right and left direction with respect to the drive gear body 55. However, the leftward movement of the clutch discs 80 and the output-side piston disc 81 is limited by the output-side cir. clip 83, which is placed in an anchoring groove 55b provided at the left end of the output-side spline-grooves 55a.

Figure 12:
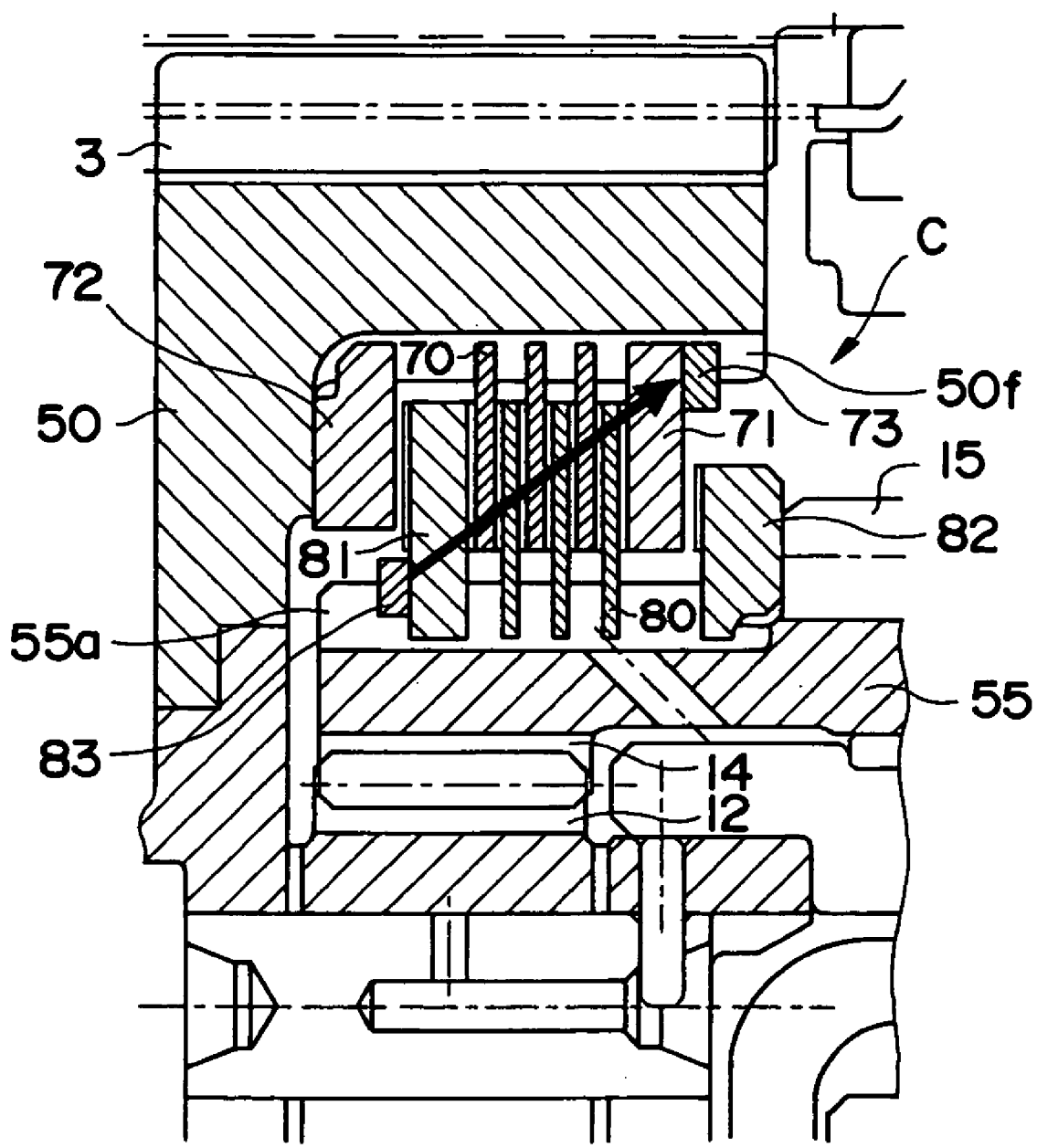
FIG. 12 is an illustration showing an action taken during acceleration by the differential limiter as a first embodiment.

As shown in FIG. 12, in the differential limiter C, a plurality of clutch plates 70 and a plurality of clutch discs 80 are disposed axially by turns between the input-side piston plate 71 and the output-side piston disc 81, with each of the friction materials 70b facing one of the friction materials 80b, correspondingly. In addition, the input-side contacting member 72 is disposed at the left end of the input-side spline-grooves 50f while the output-side contacting member 82 is disposed at the right end of the output-side spline-grooves 55a. Generally, the clutch plates 70, the clutch discs 80, the input-side piston plate 71 and the output-side piston disc 81 are disposed at a certain pitch to allow a clearance (initial clearance) between two corresponding ones of these elements for reducing dragging loss.

The second retaining member 52, which is supported rotatably by the right taper roller bearing 61, is provided with a through bore 52c extending in the axial direction. In the through bore 52c, an end portion of the right axle shaft 4a is supported rotatably, and on that end of the right axle shaft 4a, a second sun gear body 56, on which the second sun gear 21 is formed, is spline-fitted.

The output gear body 50, which is supported rotatably by the left taper roller bearing 62, is provided with a through bore 50j extending in the axial direction. In the through bore 50j, an end portion of the left axle shaft 4b is supported rotatably, and on that end of the left axle shaft 4b, a third retaining member 53, which constitutes the second carrier 23, is spline-fitted. The third retaining member 53 is provided with second inside carrier pins 23a, which are press-fitted therein and rotatably support the second inner pinion gears 22a, respectively, and with second outside carrier pins 23b, which are also press-fitted therein and rotatably support the second outer pinion gears 22b, respectively. Furthermore, on the opposite side of the second inside and outside carrier pins 23a and 23b, a fourth retaining member 54 is provided in a one-piece body with these pins. As a result, the second carrier 23 comprises the third retaining member 53, the second inside and outside carrier pins 23a and 23b, and the fourth retaining member 54. Moreover, radially over the third retaining member 53, a connection gear member 57, which comprises the first sun gear 11 and the second ring gear 24, is disposed rotatable with respect to the third retaining member 53.

In the power divider DF, the output driven gear 3 (and the output drive gear 2) comprises a helical gear as shown in FIG. 5, for improving the contact ratio of the gear and making the rotation smooth and quiet. In the same way, the rear-wheel drive gear 15 (and the rear-wheel driven gear 31) comprises a helical gear though it is not shown in the drawings. The output driven gear 3 and the rear-wheel drive gear 15, because they are helical gears, receive gear reactions (thrusts) in the direction of the rotational axis while the vehicle is accelerating by the rotational power of the engine E or while it is decelerating by the engine brake action or the like.

Figure 13:
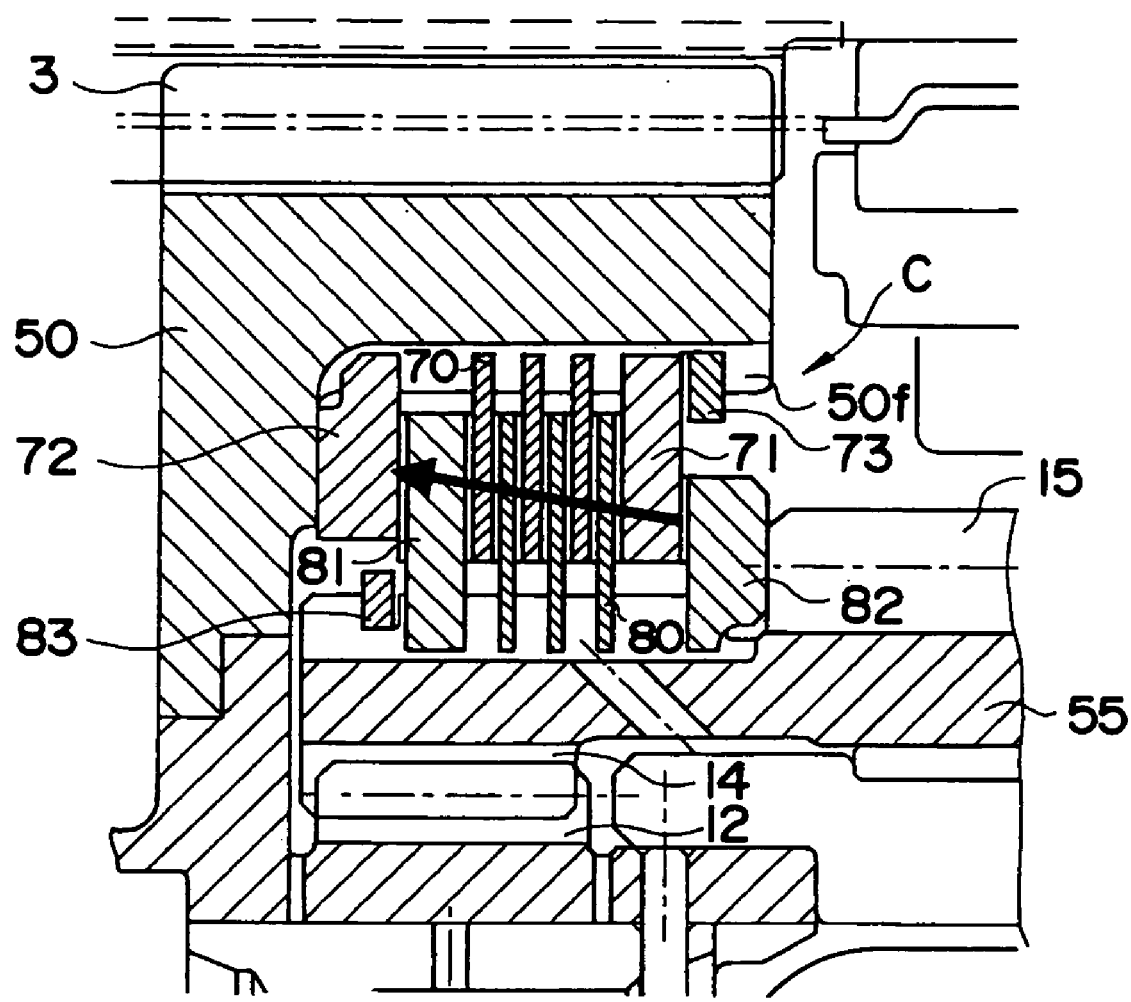
FIG. 13 is an illustration showing an action taken during deceleration by the differential limiter as a first embodiment.

In other words, in the central differential mechanism, while the vehicle is in acceleration, the rear-wheel drive gear 15 receives a rightward gear reaction in the direction of the rotational axis from the rear-wheel driven gear 31 at the respective meshing part thereof, and this gear reaction pushes the output rotating member (drive gear body 55) rightward, resulting in the drive gear body 55 sliding rightward. In this instance, the output-side piston disc 81, whose leftward movement is limited by the output-side cir. clip 83, pushes the clutch plates 70 and the clutch discs 80 against the input-side piston plate 71 (input-side cir. clip 73) as shown in FIG. 12. As a result, a friction (rotational resistance) is generated among the clutch plates 70 and the clutch discs 80, the friction reducing the rotational difference between the first carrier 13 and the first ring gear 14. On the other hand, while the vehicle is in deceleration, the rear-wheel drive gear 15 receives a leftward gear reaction in the direction of the rotational axis from the rear-wheel driven gear 31, and this gear reaction pushes the output rotating member (drive gear body 55) leftward, resulting in the drive gear body 55 sliding leftward. In this instance, the input-side piston plate 71, whose rightward movement is restricted by the output-side contacting member 82, pushes the clutch discs 80 and the clutch plates 70 against the output-side piston disc 81 (input-side contacting member 72) as shown in FIG. 13. As a result, a friction (rotational resistance) is generated among the clutch discs 80 and the clutch plates 70, the friction reducing the rotational difference between the first carrier 13 and the first ring gear 14.

Now, the effectiveness of the power divider DF, which is constructed as described above, is explained in reference to FIG. 14. For example, while the vehicle is going forward, if a rear wheel 37a (37b) slips, then the rotational speed of the front-wheel side (first sun gear 11) becomes lower than that of the first carrier 13 in the first planetary gear train 10 as indicated by broken line C in FIG. 2. As a result, the rotational driving force (torque) is distributed more to the rear-wheel side than to the front-wheel side. In this condition, if the vehicle is accelerated, then a gear reaction is generated, so a friction is generated by the contact of the clutch plates 70 and the clutch discs 80, which are pushed by the gear reaction, in the differential limiter C. Because this friction reduces the rotational difference between the first carrier 13 and the first ring gear 14 as described above, the rotational speed of the first sun gear 11 is now increased, so that the front wheels, which are not slipping, can receive an increased distribution of the rotational driving force. On the other hand, while the vehicle is going forward, if a front wheel 5a (5b) slips, then the rotational speed of the front-wheel side (first sun gear 11) becomes higher than that of the first carrier 13 in the first planetary gear train 10 as indicated by broken line B in FIG. 2. As a result, the torque is distributed more to the front-wheel side. In this condition, if the vehicle is accelerated, then the differential limiter C reduces the rotational difference between the first carrier 13 and the first ring gear 14 in the same way as described above, reducing the rotational speed of the first sun gear 11. Therefore, the rear wheels, which are not slipping, can receive an increased distribution of the torque. This same effect, i.e., the increased distribution of the rotational driving force to the wheels that are not slipping, is observed also in cases where the vehicle is decelerating while it is going forward and where the vehicle is accelerating or decelerating while it is going backward.

Figure 14:
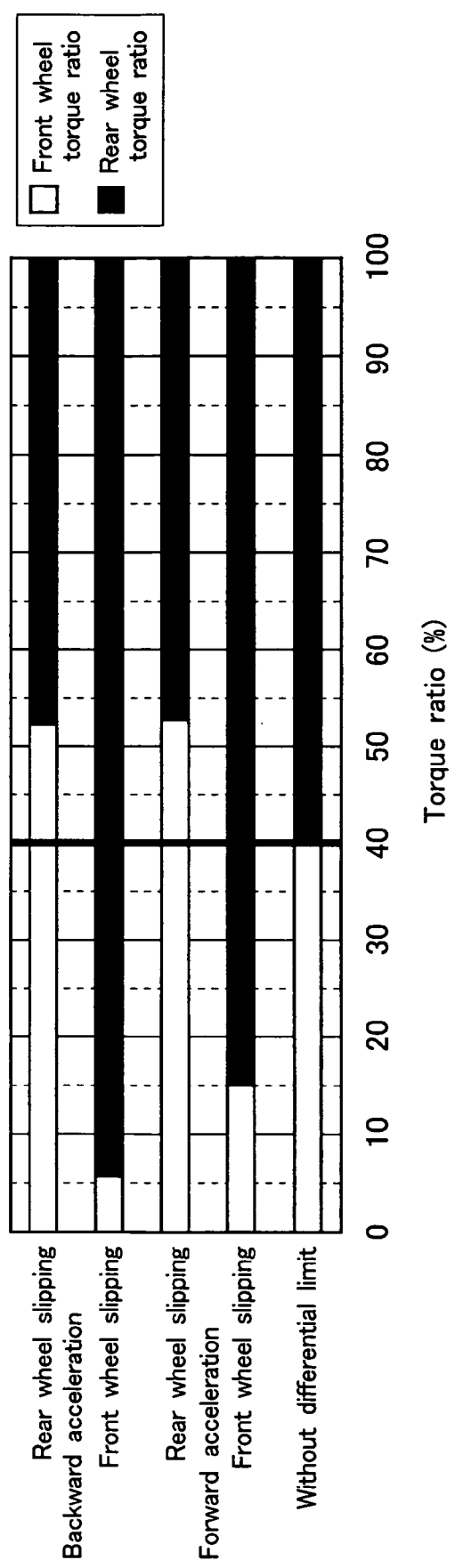
FIG. 14 is an illustration showing torque distributions by the four-wheel drive unit.

Because the differential limiter C limits the rotational difference between the input rotating member (first carrier 13) and the output rotating member (first ring gear 14) in this way, while the vehicle is accelerating or decelerating, the rotational driving force is distributed more to the front wheels 5a and 5b or to the rear wheels 37a and 37b that are not slipping. As a result, the driving force of the engine E is used efficiently. In the power divider, the differential limiter C is positioned between the output gear body 50 and the drive gear body 55 for saving space, so the provision of the differential limiter does not affect the size of the power divider DF, which may otherwise experience an enlargement from the addition of the differential limiter. Because the gear reaction (thrust) that acts on the rear-wheel drive gear 15 in the direction of the rotational axis is utilized for the actuation of the differential limiter C, no special parts are necessary for the actuation. As a result, this construction is relatively simple, so the power divider can be manufactured cost-effectively without weight increase. Furthermore, while the vehicle is accelerating and cornering, the power divider DF distributes the driving force more to the rear wheels 37a and 37b as shown in FIG. 14, so the maneuverability is close to neutral steering. Therefore, the provision of the power divider DF improves the maneuverability of the vehicle.

EXAMPLE 2

Figure 15:
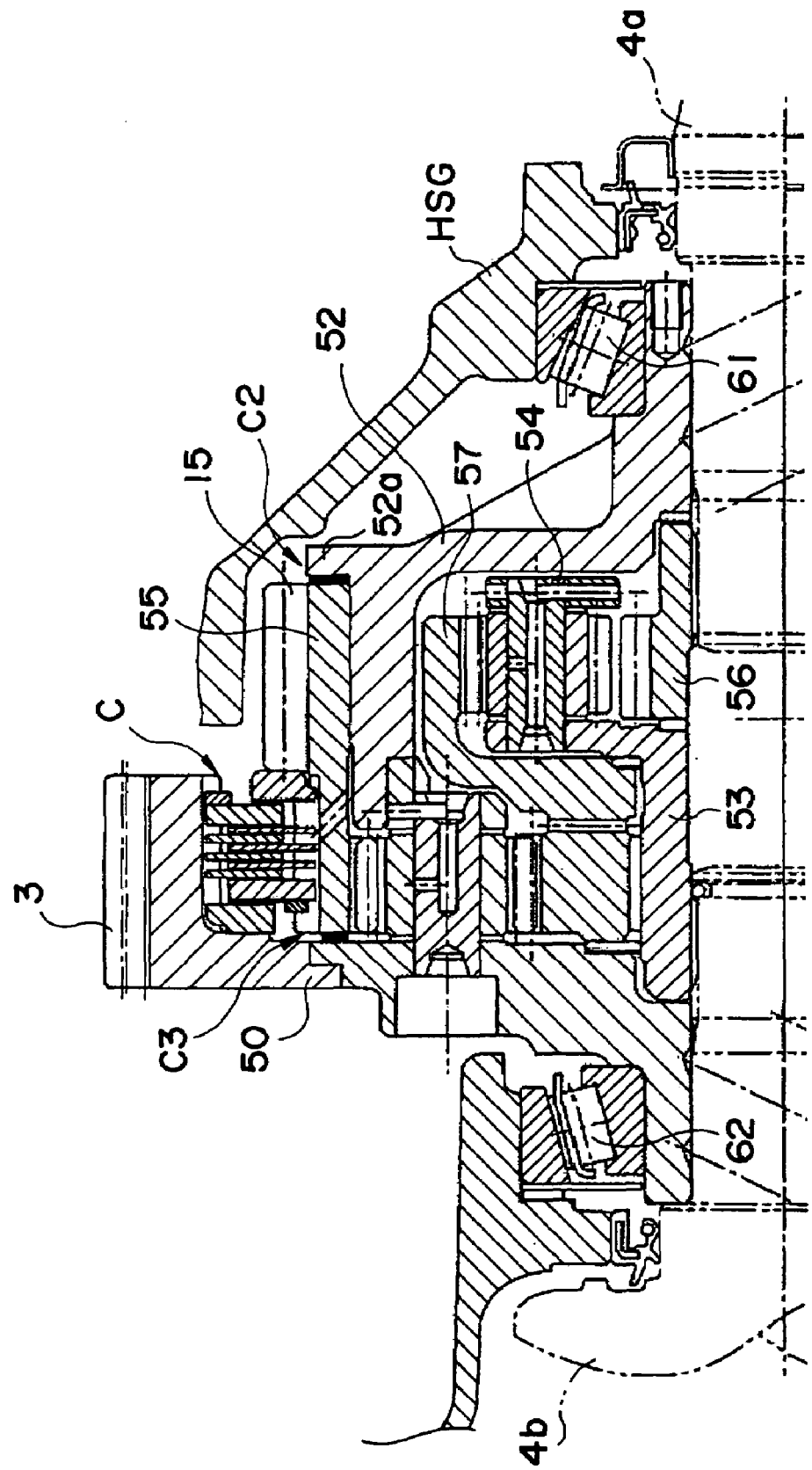
FIG. 15 is a sectional view of a power divider as a second embodiment, whose important parts are shown in enlargement.

In the above described first embodiment, the present invention is embodied as a design where the difference in rotational speed between the input rotating member and the output rotating member is to be reduced by the differential limiter C. However, in bad road condition, if the front wheels 5a and 5b or the rear wheels 37a and 37b are slipping, then it can be better to lock the input rotating member and the output rotating member, i.e., to lock the central differential mechanism, for escaping such road condition. For this reason, a second embodiment of the present invention is equipped with locking clutches C2 and C3, and this embodiment is described in reference to FIG. 15, which shows only the important parts of the second embodiment, leaving out the other parts, which are the same as those of the first embodiment. In the drawing, the parts identical with those of the first embodiment are indicated by their identical numbers, and no description is given of them.

As described above, while the vehicle is accelerating, the drive gear body 55 (output rotating member) is pushed rightward by the gear reaction, which is received by the rear-wheel drive gear 15, so it slides rightward with respect to the output gear body 50 and the second retaining member 52 (input rotating member). In consideration of this, an acceleration-side clutch C2 is provided by forming an engaging portion 52a that extends radially outward from the outer periphery of the second retaining member 52 and by attaching friction materials thereon. A friction material with a high friction coefficient is attached concentrically on the left side face of the engaging portion 52, and another friction material with a high friction coefficient is also attached concentrically on the surface (surface 55d shown in FIG. 9) of the drive gear body 55 that faces the engaging portion 52a. The acceleration-side clutch C2 engages when the rear-wheel drive gear 15 receives the gear reaction by the acceleration, and this reaction becomes larger than a predetermined value. While the acceleration-side clutch C2 is in engagement, the output rotating member (the drive gear body 55) and the input rotating member (the second retaining member 52 and the output gear body 50) are locked with each other, so they rotate together as a one-piece body. As a result, the rotational driving force is distributed to the wheels that are not slipping.

On the other hand, while the vehicle is decelerating, the drive gear body 55 is pushed leftward by the gear reaction, which is received by the rear-wheel drive gear 15, so it slides leftward with respect to the output gear body 50 and the second retaining member 52. In consideration of this, a deceleration-side clutch C3 is provided by attaching friction materials with a high friction coefficient concentrically on the left side face (surface 55c shown in FIG. 8 or FIG. 9) of the drive gear body 55 and concentrically on the surface (surface 50i shown in FIG. 6) of the output gear body 50, respectively. The deceleration-side clutch C3 engages when the rear-wheel drive gear 15 receives the gear reaction by the deceleration and this reaction becomes larger than a predetermined value. While the deceleration-side clutch C3 is in engagement, the drive gear body 55 and the output gear body 50 are locked with each other, so they rotate together as a one-piece body. As a result, the rotational driving force is distributed to the wheels that are not slipping.

The acceleration- and deceleration-side clutches C2 and C3 may comprise dogtooth clutches, which are mechanical devices, instead of the friction materials, which have a high friction coefficient.

EXAMPLE 3

In the above described first and second embodiments, the differential limiter C, which limits the rotational difference between the front wheels and the rear wheels in the central differential mechanism, comprises a wet type multiple disc clutch, and the thrust (gear reaction) generated by the helical angle of the rear-wheel drive gear 15 is used for activating the differential limiter C. However, there are some problems with this construction. For example, noise may occur or uneven meshing of gear teeth can occur from inclination of any of the helical gears. It may be necessary to increase the stiffness of the gears for improving their strength. Clutch judder may occur if there is a lack of lubrication for the wet-type multiple disc clutch. In addition, if the accelerator is turned off, then the vehicle may experience a change in the driving condition, which change is unexpected by the driver and therefore giving him uneasiness, because the differential limiters C as the first and second embodiments are activated by the torque generated during the acceleration or the deceleration (such a design is referred to as "torque-sensitive"). Moreover, there are initial clearances among the clutch plates 70 and the clutch discs 80, which are alternatively aligned in the differential limiter C, for reducing dragging loss as mentioned above. These clearances cause a delay in the response of the differential limiter C.

Figure 16:
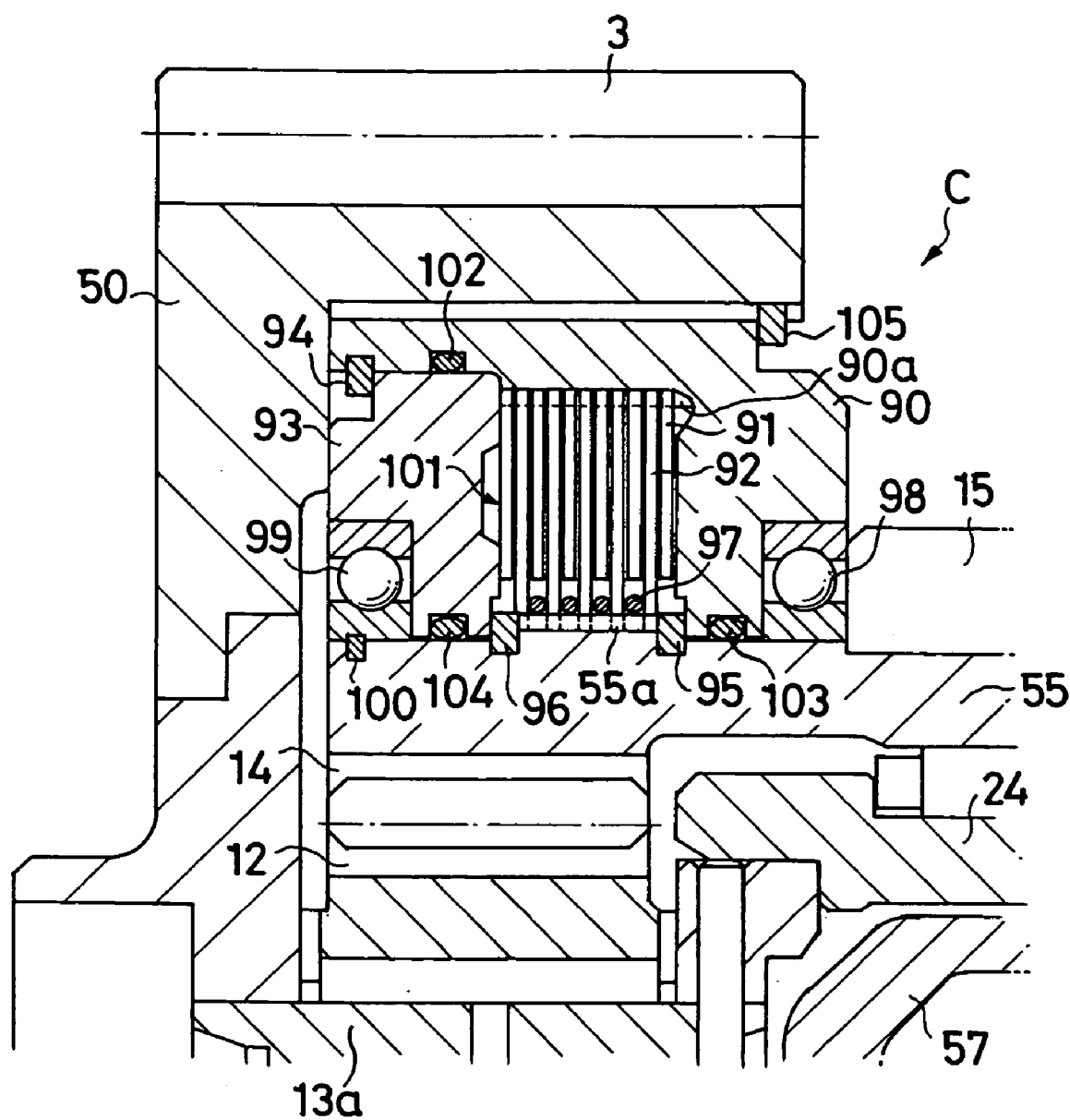
FIG. 16 is a sectional view of a power divider as a third embodiment, whose important parts are shown in enlargement.

To solve such problems, now, a power divider DF as a third embodiment comprises a viscous coupling, and this embodiment is described in reference to FIG. 16, which shows only the important parts as in the case of the second embodiment. The other components and their arrangement not shown are the same as the first embodiment, and the components identical with those in the first embodiment are indicated by their identical numbers for leaving out their description.

The differential limiter C as a third embodiment comprises a clutch case 90, which is disposed over the outer periphery of the drive gear body 55, a plurality of outer plates 91, which are spline-fitted in spline grooves 90a provided on the inner circumferential surface of the clutch case 90, a plurality of inner plates 92, which are disposed alternately with the outer plates 91 and are spline-fitted in spline grooves 55a provided on the left-side outer circumferential surface of the drive gear body 55, and a clutch cover 93, which is provided around the left end of the drive gear body 55, lidding the left-side opening of the clutch case 90.

The clutch cover 93 is fixed in the clutch case 90 by a cir. clip 94, which is positioned on the inner circumferential surface of the clutch case 90. The outer plates 91 are retained axially by the clutch case 90 and by the clutch cover 93 while the inner plates 92 are retained by cir. clips 95 and 96, which are positioned at the right and left ends of the spline-grooves 55a. Furthermore, in each clearance from one inner plate 92 to a next inner plate, a guide ring 97 is provided surrounding the outer periphery of the drive gear body 55. In this condition, the inner plates 92 and the outer plates 91 are positioned axially (in the right and left direction) and disposed alternatively one after the other with a small clearance between them. The outer plates 91 and the inner plates 92 are provided with through holes or cut-out grooves, respectively, though they are not illustrated in the drawing.

The clutch case 90, the outer plates 91 and the clutch cover 93 are supported by bearings 98 and 99 and are rotatable with respect to the drive gear body 55. In this arrangement, the inner ring of the left-side bearing 99 is fixed on the drive gear body 55 by a set ring 100.

With this arrangement, the differential limiter C comprises a power-transmission chamber 101, which is defined by the drive gear body 55, the clutch case 90, and the clutch cover 93 and which accommodates the outer plates 91 and the inner plates 92. The power-transmission chamber 101 is filled with silicon oil as viscous fluid. For preventing the oil from leaking, the power-transmission chamber 101 is sealed by an O-ring 102 that is positioned in a ring-like groove provided on the inner circumferential surface of the clutch case 90 and between the clutch case 90 and the clutch cover 93, by an O-ring 103 that is positioned in a ring-like groove provided on the innermost circumferential surface of the clutch case 90 and between the clutch case 90 and the drive gear body 55, and by an O-ring 104 that is positioned in a ring-like groove provided on the innermost circumferential surface of the clutch cover 93 and between the clutch cover 93 and the drive gear body 55.

The clutch case 90, which is provided with spline-grooves on the outer periphery thereof, is spline-fitted in the output gear body 50, whose inner circumferential surface is provided also with splines. In this condition, the clutch case 90 is retained by a cir. clip 105, which is fixed in a ring-like groove provided on the inner circumferential surface of the output gear body 50. Therefore, the clutch case 90, the outer plates 91 and the clutch cover 93 rotate together with the output gear body 50 as a one-piece body, with respect to the drive gear body 55. In this construction, the drive gear body (output rotating member) 55 as a third embodiment does not slide in the direction of the rotational axis with respect to the input rotating member.

According to the differential limiter C, which is constructed as described above, the rotational difference between the output gear body 50 and the drive gear body 55 is limited by the friction or reaction of the silicon oil against the shearing force of the outer plates 91 rotating with respect to the inner plates 92. If the front wheels 5a and 5b or the rear wheels 37a and 37b are slipping, then a difference in rotational speed is generated between the input rotating member (output gear body 50) and the output rotating member (drive gear body 55), and this rotational difference translates to the relative rotation between the outer plates 91, which rotate together with the output gear body 50 as a one-piece body, and the inner plates 92, which are spline-fitted to and rotate together with the drive gear body 55 as a one-piece body. As the outer plates 91 rotate with respect to the inner plates 92 in the silicon oil in the power-transmission chamber 101, the friction of the silicon oil limits the rotational difference between the output gear body 50 and the drive gear body 55, i.e., between the first carrier 13 and the first ring gear 14. In other words, the rotational driving force is distributed also to the wheels 5a and 5b or 37a and 37b that are not slipping. In this way, the driving force of the engine E is utilized effectively.

As described, also in the power divider DF as the third embodiment, the differential limiter C is provided compactly in the space between the output gear body 50 and the drive gear body 55 without any space provided especially for the provision of the differential limiter C. Furthermore, the differential limiter C as the third embodiment comprises a viscous coupling that uses silicon oil, so it does not require any part for the activation. As a result, the power divider is simple in construction, so it does not weigh much and can be manufactured cost-effectively. In addition, because the differential limiter C comprises a viscous coupling, there is no delay in the response when a rotational difference occurs between the input rotating member and the output rotating member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2004-379408 filed on Dec. 28, 2004, which is incorporated herein by reference.

What is claimed is:

1. A vehicular four-wheel drive unit comprising a central differential mechanism and an axle-differential mechanism in a housing, said central differential mechanism dividing and transmitting a rotational driving force of a drive source to a front-wheel side and to a rear-wheel side, and said axle-differential mechanism further dividing and transmitting said rotational driving force that has been divided by said central differential mechanism to a right wheel and to a left wheel of one of said front-wheel side and said rear-wheel side;

wherein:

said central differential mechanism comprises a single pinion type first planetary gear train that includes an input gear member, which receives said rotational driving force of said drive source and is thereby driven rotationally, a first carrier member, which is provided in a one-piece body with said input gear member, a first sun gear member, a first ring gear member and an output gear member, which is provided in a one-piece body with and around said first ring gear member and which transmits said rotational driving force to another of said front-wheel side and said rear-wheel side;

said axle-differential mechanism comprises a double pinion type second planetary gear train that includes a second ring gear member, which is provided in a one-piece body with said first sun gear member, a second sun gear member, which is connected to one of said right and left wheels, and a second carrier member, which is connected to another of said right and left wheels;

a cylindrical retaining member is connected fittingly to said first carrier member, which is provided in a one-piece body with said input gear member, together constituting an input rotating member, in which said second planetary gear train is disposed;

said first ring gear member and said output gear member constitute a cylindrical output rotating member in a one-piece body, which is disposed radially surrounding said retaining member;

a differential limiter is provided between an inner circumferential surface of said input gear member and an outer circumferential surface of said output rotating member; and said differential limiter generates a rotational resistance, which acts to reduce a rotational difference between said input rotating member and said output rotating member.

2. The vehicular four-wheel drive unit as set forth in claim 1, wherein:

said differential limiter comprises an input-side friction member, which is disposed on said inner circumferential surface of said input gear member, and an output-side friction member, which is disposed on said outer circumferential surface of said output rotating member, said friction members being also disposed one after another in direction of rotational axis between said input rotating member and said output rotating member;

said output rotating member is slidable with respect to said retaining member in the direction of rotational axis;

said output gear member comprises a helical gear; and while said rotational driving force is being transmitted through said output gear member, a thrust is generated in the direction of rotational axis, acting to squeeze said input-side friction member and said output-side friction member between said input rotating member and said output rotating member, resulting in a generation of friction between said input-side friction member and said output-side friction member, said friction acting as said rotational resistance, which reduces the rotational difference between said input rotating member and said output rotating member.

3. The vehicular four-wheel drive unit as set forth in claim 2, wherein:
said input-side friction member and said output-side friction member are squeezed between said input rotating member and said output rotating member by a thrust being generated while a rotational driving force is being transmitted for acceleration through said output gear member and also by a thrust being generated while a rotational driving force is being transmitted for deceleration.

4. The vehicular four-wheel drive unit as set forth in claim 2, further comprising:
a first clutch, which is provided between said input gear member and said output rotating member on one side along said rotational axis and which is brought into engagement when said output rotating member slides to said one side, said engagement of said first clutch making said input rotating member and said output rotating member rotate as a one-piece body; and
a second clutch, which is provided between said retaining member and said output rotating member on another side along said rotational axis and which is brought into engagement when said output rotating member slides to said other side, said engagement of said second clutch making said input rotating member and said output rotating member rotate as a one-piece body.

5. The vehicular four-wheel drive unit as set forth in claim 4, wherein:
said first clutch comprises a friction material with a high friction coefficient, which material is provided between said input gear member and said output rotating member on one side along said rotational axis; and said second clutch comprises a friction material with a high friction coefficient, which material is provided between said retaining member and said output rotating member on the other side along said rotational axis.

6. The vehicular four-wheel drive unit as set forth in claim 4, wherein:
said first clutch comprises a locking mechanism, which is provided between said input gear member and said output rotating member on one side along said rotational axis; and
said second clutch comprises a locking mechanism, which is provided between said retaining member and said output rotating member on the other side along said rotational axis.

7. The vehicular four-wheel drive unit as set forth in claim 1, wherein:
said differential limiter comprises:
an input-side plate, which is disposed on said inner circumferential surface of said input gear member;
an output-side plate, which is disposed on said outer circumferential surface of said output rotating member; and
a power-transmission chamber, which accommodates said input-side plate and said output-side plate and which is filled with a viscous fluid;
wherein:
a viscous resistance that is generated by said viscous fluid against said input-side plate and said output-side plate being rotated acts as said rotational resistance, which reduces the rotational difference between said input rotating member and said output rotating member.

8. The vehicular four-wheel drive unit as set forth in claim 7, wherein said viscous fluid comprises a silicon oil.

* * * * *